US006841134B2

(12) United States Patent
Hanus et al.

(10) Patent No.: US 6,841,134 B2
(45) Date of Patent: Jan. 11, 2005

(54) ELECTRICALLY-HEATED CHEMICAL PROCESS REACTOR

(75) Inventors: Gary J. Hanus, Edina, MN (US); Stuart J. Olstad, Maple Grove, MN (US)

(73) Assignee: Phoenix Solutions Co., Crystal, MN (US)

( * ) Notice: Subject to any disclaimer, the term of this patent is extended or adjusted under 35 U.S.C. 154(b) by 813 days.

(21) Appl. No.: 09/760,081

(22) Filed: Jan. 12, 2001

(65) Prior Publication Data

US 2002/0094312 A1 Jul. 18, 2002

(51) Int. Cl.[7] .................................................. F01N 3/02
(52) U.S. Cl. ........................ 422/174; 422/199; 422/187
(58) Field of Search ................................ 422/198, 199, 422/187, 173, 174

(56) References Cited

U.S. PATENT DOCUMENTS

| | | | | |
|---|---|---|---|---|
| 3,811,845 A | * | 5/1974 | Nakamura | 422/173 |
| 4,692,306 A | * | 9/1987 | Minet et al. | 422/49 |
| 5,409,669 A | * | 4/1995 | Smith et al. | 422/174 |
| 5,453,116 A | * | 9/1995 | Fischer et al. | 95/278 |
| 5,711,816 A | * | 1/1998 | Kirlin et al. | 118/726 |
| 6,214,296 B1 | * | 4/2001 | Lou et al. | 422/148 |

OTHER PUBLICATIONS

Olstead et al, "Organic Compound Destruction and Removal Efficiency (DRE) for Plasma Incinerator Off–gases Using an Electrically Heated Secondary Combustion Chamber" 1998 Proceedings on IT3 Conference, May 11, 1998, pp 419–421, Salt Lake City, UT.
Reed et al, "Electric Heater Development and Performance Data for Mach 14 Wind Tunnel", Journal of Spacecraft and Rockets, vol. 12,No. 5 , pp 308–313, May, 1974.
"Phoenix Solutions Co.—Products and Services", sales brochure, Nov., 1998.
Background/Qualifications of Phoenix Solutions Co . . . sales brochure, Jul. 15, 1996.

* cited by examiner

Primary Examiner—Kiley S. Stoner
Assistant Examiner—Len Tran
(74) Attorney, Agent, or Firm—Nikolai & Mersereau, P.A.; Thomas J. Nikolai

(57) ABSTRACT

An electrically-heated chemical process reactor having an inlet for receiving industrial gases, an internal channel for passing the flow of gases, and an outlet for expelling the gases. An array of current-carrying screen element packets are arranged along the channel for receiving a heating current, and the internal gas channel includes passages through the array for preheating the gas prior to entering the channel.

19 Claims, 9 Drawing Sheets

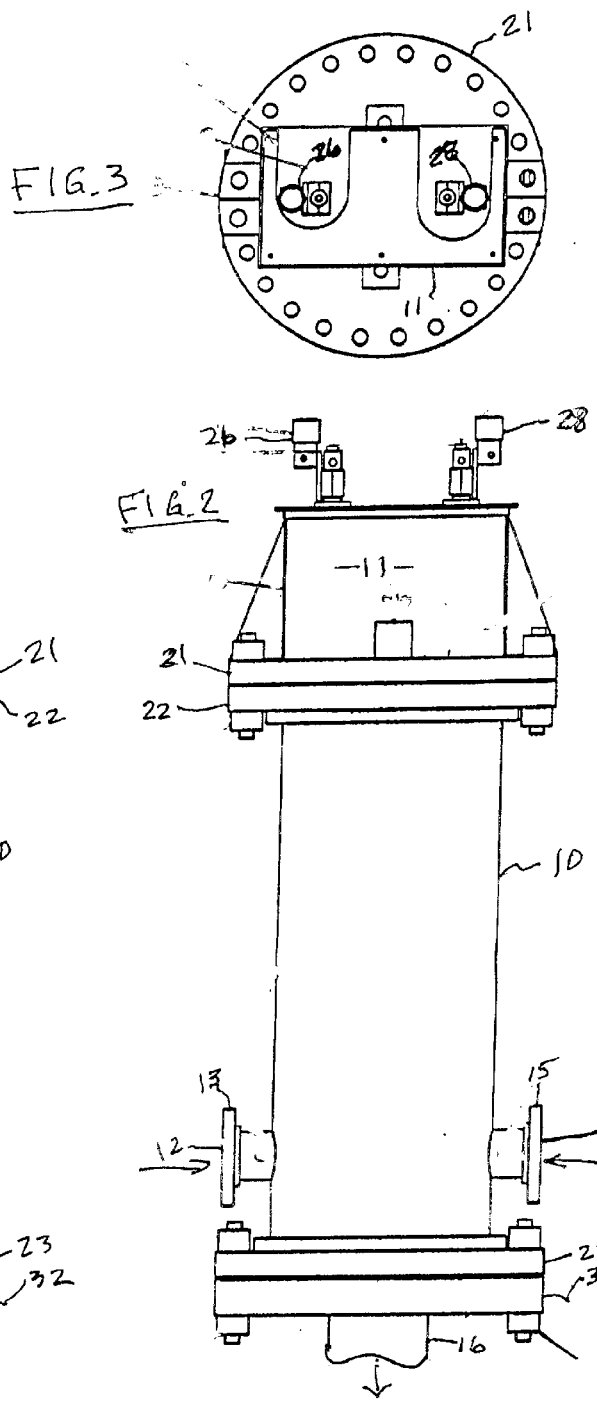

ELECTRICALLY-HEATED CHEMICAL PROCESS REACTOR

BACKGROUND OF THE INVENTION

The present invention relates to an electrically-heated chemical process reactor. More specifically, the invention relates to an electrically-heated screen heater located in a housing adapted for receiving and passing a flow of gases, wherein the gases flowing through the heater have a low residence time within the heater but are heated to a very high temperature while passing through the heater. The term "high temperature" in this case means temperatures in the range of from about 1600° F. to about 2500° F., and the term "low residence time" means a time on the order of about 10 milliseconds.

The heater described herein comprises an array of current-carrying wire screen element packets respectively arranged in series electrical connection and aligned in a channel for a gas-flow to pass through all of them, wherein the wire screen element packets may carry thousands of amperes of current at a relatively low voltage. The gas flow path is arranged to form an efficient, low pressure drop heat exchanger mechanism.

One advantage of the present invention over the prior art is that the ratio of heated surface area to gas volume is over ten times higher than that of prior art devices used for the same purposes, such as conventional gas-fired radiant furnaces and/or reactors. It has been demonstrated that the process gas temperatures approach the temperature of the heated wire screen element packets, thereby improving the heat exchanger effectiveness parameter.

A second advantage is the reduced structural requirement imposed on the heating elements. Prior art reactors suffer from temperature and pressure limitations because the tubes that heat the gas are also pressure-bearing components that are required for containing and transporting the gas. In the present invention, the heating elements are not required to contain or transport the gas, greatly reducing the structural requirement.

Hence, the present invention can run at higher temperatures than the prior art (by virtue of the reduced structural requirement) while delivering more of that temperature to the process stream (by virtue of the improved heat exchanger effectiveness).

Residence time and process temperature are the dominant parameters governing conversion and selectivity in a chemical conversion and/or cracking application. For example, in a well-known process for converting a mixture of ethane/steam to ethylene (mixture of approximately 3:1, ethane:steam), operating at a temperature of about 2000° F. and passing through a heater of approximately four to five feet in length, at Mach flow rates (the ratio of the local process gas flow velocity to the local speed of sound) of about 0.2 for a reasonable pressure drop through the heater, the typical prior art residence time exceeds 100 milliseconds (msec.). The invention described herein can produce the conversion required within a residence time of about 10 msecs.

The heater described herein is a very low-voltage, high-current device. Among the advantages of this invention are the fact that it can be operated in a direct current mode or in a single- or three-phase alternating current mode. The number, size and geometry of the screen element packets described herein can be adjusted or "tuned" to the specific needs of the process at hand, such as temperature and heat flux profile "tailoring", as is frequently beneficial in various new and preexisting petrochemical processes. The length and cross-sectional flow area of the gas flow channel is selected to achieve the desired residence time for an optimum process gas temperature and pressure. The materials and configuration of the screens can be selected to maximize the screen operating temperature for various different conversion processes; the screen mesh wire diameters, screen size and shape, number of screens per packet, and number of packets provide a great deal of flexibility in configuring a process reactor to a desired heat flux profile or for a given gas processing or gas reaction requirement.

A novel feature of the invention is the construction of the heater array, providing a wedge clamping mechanism for clamping individual screen element packets to an electrical conductor block in a manner which provides a good electrical connection and relieves thermal stresses to the clamping mechanism, and to the entire array.

The present invention incorporates a novel heat exchange flow path to preheat gas flowing into the gas flow channel to a partial elevated temperature, to thereby improve the efficiency of heating the process gas to the desired operating temperature.

The high operating temperatures and associated materials inside the device produce significant temperature differences, both within the device and between the device and the components attached to the device, which lead to differential expansion and contraction. Therefore, the present invention incorporates an expansion joint/gas seal to ensure that the process gas is fully confined within the reactor under the extreme temperature of operation.

SUMMARY OF THE INVENTION

An array of current-carrying wire screen element packets is arranged between electrical conductor blocks inside a gas channel, confined within an outer housing. The housing has at least one gas inlet for receiving a gas flow, and the gas flow is directed through heat exchange passages for preheating, and then through the channel which contains the array of screen element packets, which are heated to very high temperatures by current flow. The reactor housing is attached to components of the internal array by means of several bellows expansion joints, to provide a gas seal within the housing while permitting uneven expansion and contraction of the electrical conductors and certain components of the array, caused by temperature variations during operation of the apparatus.

BRIEF DESCRIPTION OF THE DRAWINGS

FIG. 1 shows a front elevation view of the invention;

FIG. 2 shows a side elevation view, orthogonal to the view of FIG. 1;

FIG. 3 shows a top view of FIG. 2;

DESCRIPTION OF THE PREFERRED EMBODIMENT

Figure 4:
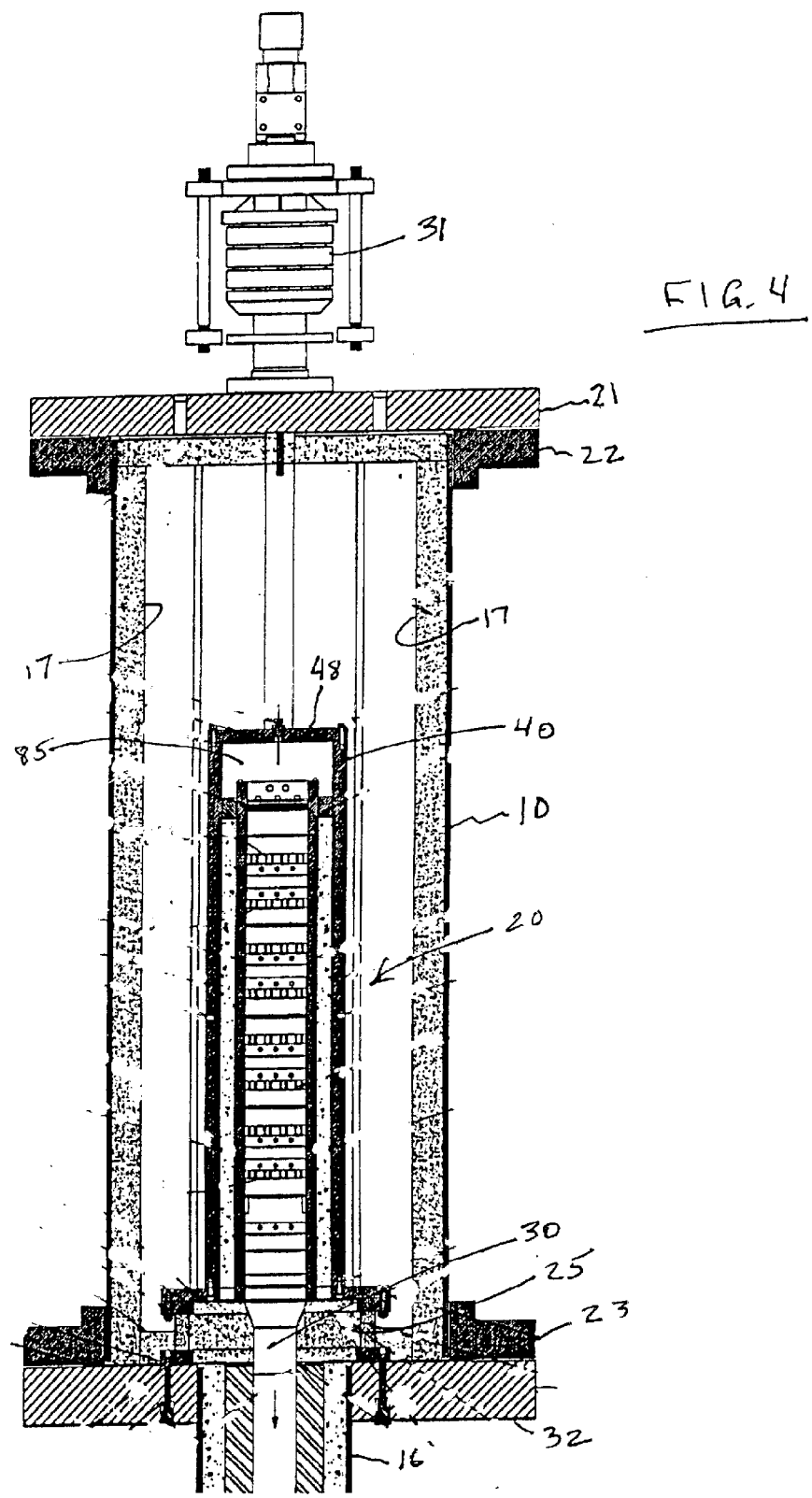
FIG. 4 shows a cross-section view of FIG. 1.

Referring to FIG. 1, the invention is shown in front elevation view, and further referring to FIG. 2, the invention is shown in side elevation view orthogonal to the view of FIG. 1. An outer housing 10 has two gas inlet pipes 12, 14 for receiving a flow of an industrial gas. The inlet pipes 12, 14 have respective connection flanges 13, 15 which are adapted for connection to an external source of industrial gas flow. The inlets 12, 14 are adapted for receiving gas flow in the directions indicated by the arrows. An outlet pipe 16 conveys the gases after heating, and delivers the heated gases to a suitable exhaust system.

An upper housing 11 encloses some of the electrical conductors associated with the invention. The internal conductors project from upper housing 11, and are shown as conductor 26 and conductor 28 in FIGS. 1–3. These conductors are connected to a low voltage, high current capacity supply (not shown). Upper housing 11 is connected to housing 10 by a bolted attachment through a thermally insulated housing head 21, and a flange 22 on housing 10. Housing 10 is connected to a support base (not shown) by a bolted connection through a flange 23 on housing 10 and a thermally insulated housing head 32. FIG. 3 shows a top view of FIG. 2, showing upper housing 11 and housing head 21, as well as conductors 26 and 28.

Figure 5:
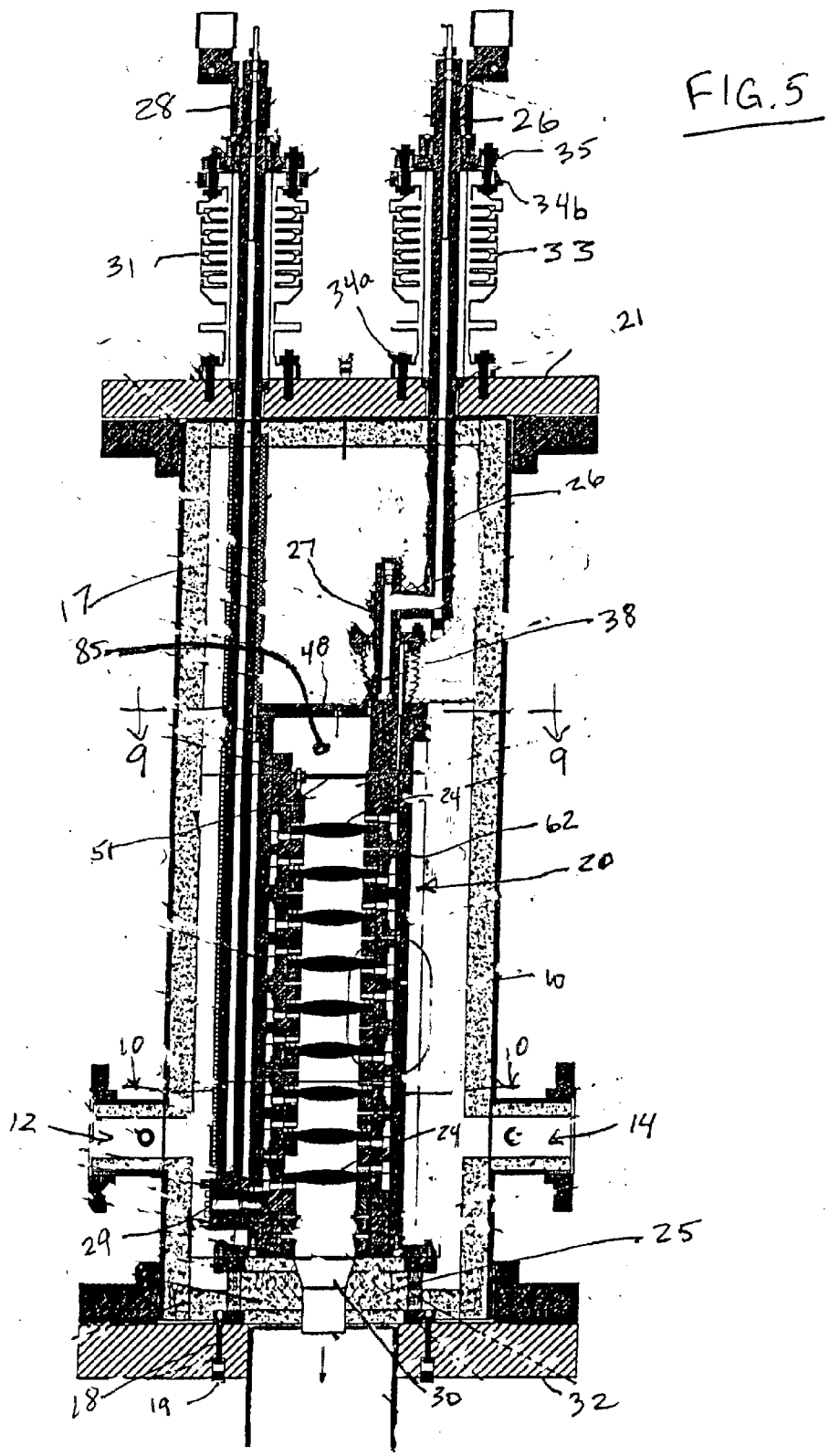
FIG. 5 shows a cross-section view of FIG. 2.

FIG. 4 and FIG. 5 show a cross-section view of FIG. 1 and FIG. 2 respectively, revealing the interior structure inside housing 10 and 11. The inside surface area of housing 10 has a thermal insulation layer 17, designed to confine heat within the housing. An array 20 of screen element packets 24 is axially positioned inside the thermal insulation layer 17, with each screen element packet 24 being mechanically and electrically attached to electrical conductors 26 and 28 by conductor blocks in a manner which provides a series electrical path between conductors 26 and 28, serially through the screen element packets. Electrical conductor 26 is connected to an electrical bus 27, and electrical conductor 28 is connected to an electrical bus 29, at respective opposite ends of array 20.

A thermally insulated housing head 21 covers one end of the outer housing 10, and a thermally insulated housing head 32 covers the other end of the outer housing 10. The array 20 is connected to an insulated spool 25 that sits atop the lower housing head 32. The insulated spool 25 thermally insulates the array 25 from the housing head 32, and contains a transition duct 30 that transitions the flow passage from the square configuration of the channel to the round configuration of the downstream components. The transition duct 30 may be formed from a high density refractory or from a high temperature alloy as the temperatures of operation permit. The insulated spool 25 is attached to the lower housing head 32 with fasteners 18 that pass through the lower housing head 32 and are threadably engaged into the lower flange of the insulated spool 25. The holes through which the fasteners 18 pass are sealed on the exterior of the housing head 32 with standard O-ring plugs 19. The interfaces between the array 20 and the spool 25 and between the spool 25 and the lower housing head 32 are sealed with high temperature gaskets or with flexible metal seals.

Conductors 26 and 28 each pass through the head 21, conductor 26 being connected outside the housing to a bellows expansion joint 33, and conductor 28 being connected to a bellows expansion joint 31. The respective bellows expansion joints provide a solid electrical connection, and a tight gas seal, as will be hereinafter described, with reference to FIG. 6A.

Because of the extreme temperatures of operation of the apparatus, it is necessary to deal with the expansion and contraction effects of the materials of the invention. For example, both conductors 26 and 28 are supported on the array 20 structure, as the respective conductor ends inside the outer housing 10 are affixed to conductive elements of the array. Conductor 28 is the longest, being affixed to array 20 at the innermost end of array 20; conductor 26 is relatively short, being affixed at the outermost end of array 20. Consequently, when interior temperatures in housing 10 are raised, the thermal expansion effects on array 20 will tend to extend conductor 26 to a greater degree than conductor 28. The difference in elongation would stress or distort the array inside housing 10, and could cause gas leakage from the housing, but for the design of the conductor expansion joints 31 and 33. These expansion joints permit independent elongation of each of the conductors 26 and 28 without stressing the apparatus. Since the two expansion joints operate and are constructed similarly, reference will be made to only one joint for an understanding of their construction.

Figure 6A:
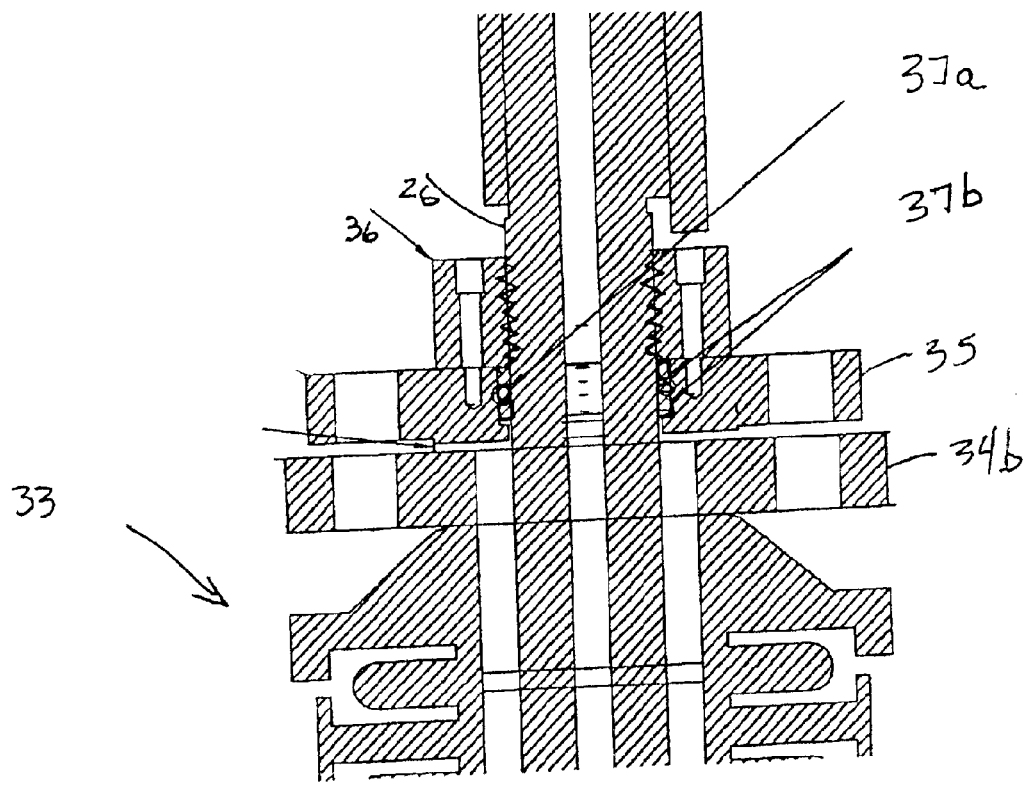
FIG. 6A shows an expanded cross-section view of a bellows expansion joint feature of the invention.

Referring to FIGS. 5 and 6A, it can be seen that the inner end of expansion joint 33 is a flange 34a, affixed to housing head 30, and the outer end of expansion joint 33 is a flange 34b. Flange 34b is affixed to a seal/flange 35, which has an O-ring 37a with backing rings 37b about an inner diameter which is sealed against conductor 26. A dielectric seal clamp 36 attached to both flange 35 and conductor 26 secures the O-ring seal 37a in position. As the array 20 becomes heated, it tends to push conductor 26 outwardly, causing the bellows expansion joint 33 to expand, and as the array 20 cools, it tends to draw conductor 26 inwardly, causing the bellows expansion joint 33 to compress. Thus, the position of each conductor 26 or 28 relative to housing head 30 is compensated by corresponding compression or expansion of the bellows expansion joint to which it is connected. The O-ring seal 37a remains static, since it does not move relative to conductor 26.

Figure 6B:
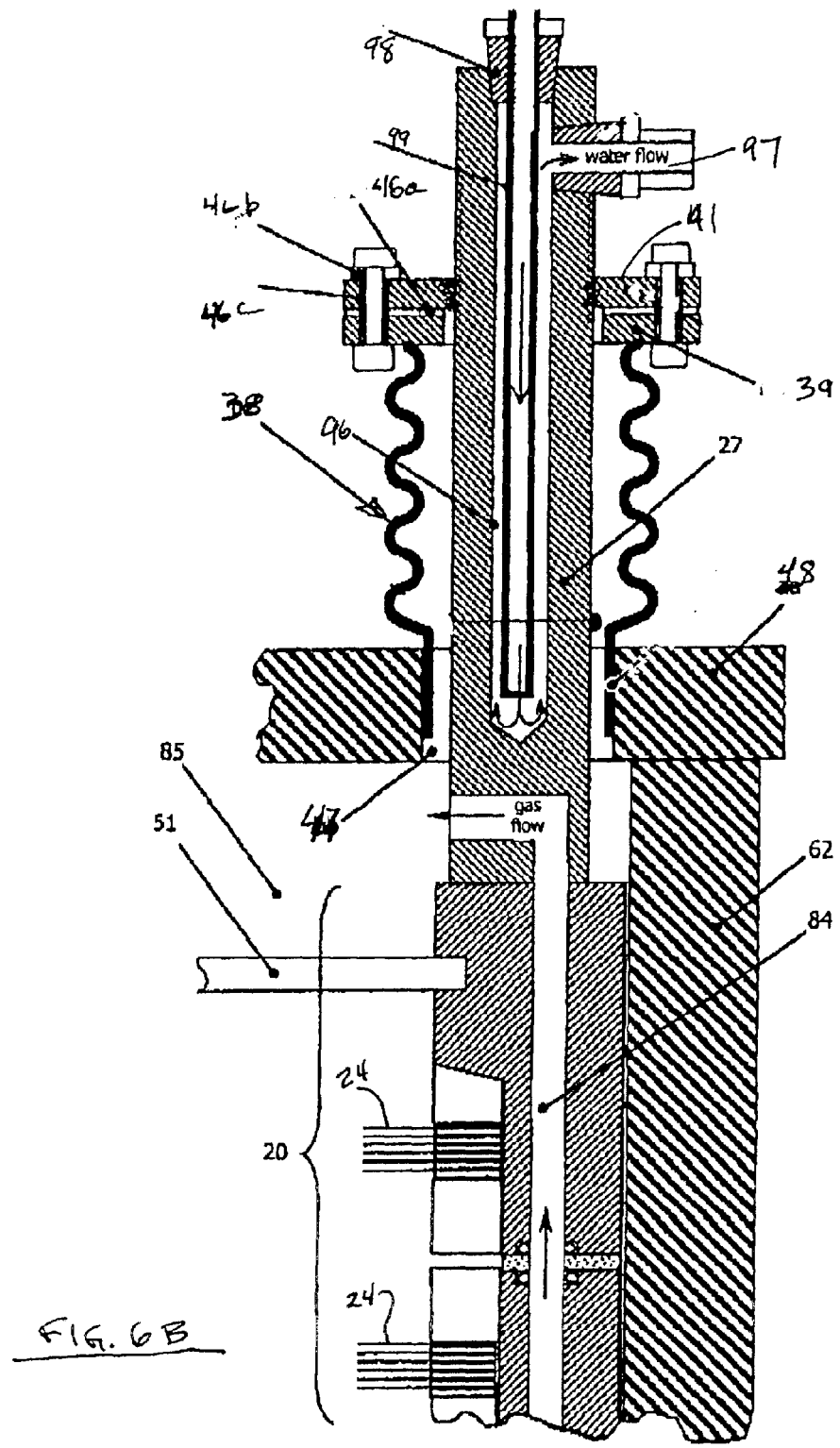
FIG. 6B shows an expanded cross-section partial view of a further bellows expansion joint feature.
Figure 7A:
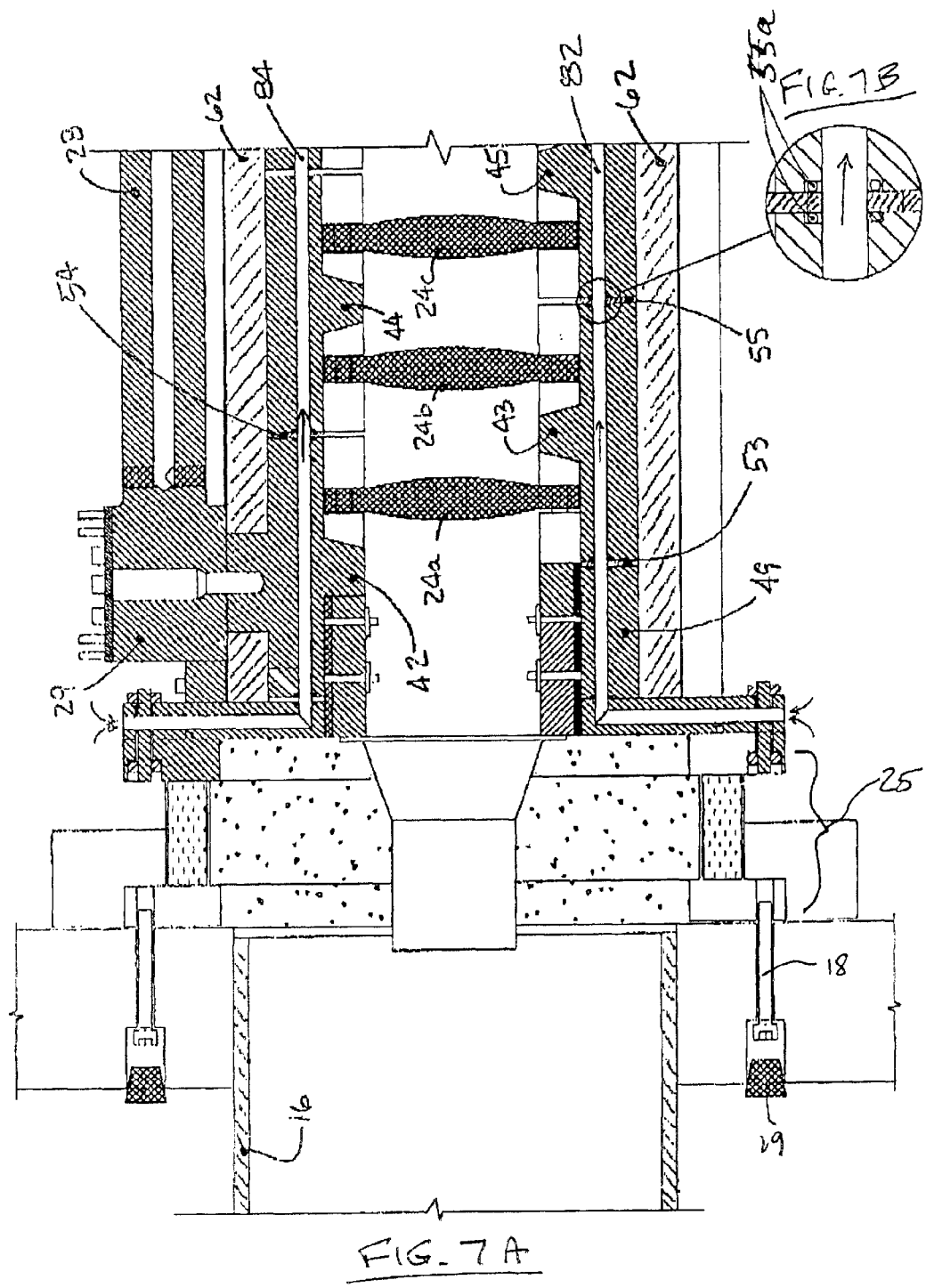
FIG. 7A shows an expanded view of a portion of the invention illustrated in FIG. 5.

FIG. 6B shows a partial cross-section view of a further bellows expansion joint 38, which is located inside the reactor as illustrated in FIG. 5. The backing plates 62 and support walls 40 (see FIG. 4) form an enclosure which supports and houses the array 20. An end view of the enclosure so formed can be seen in FIGS. 9 and 10. The top end of this enclosure is capped with an end plate 48 (see FIG. 5 and FIG. 6B), which defines the uppermost boundary of the chamber 85. Chamber 85 is the location where the gas flow passages 82 and 84 terminate, both passages having inlets proximate the lower end of housing 10, as shown in FIG. 7A, in flow communication with gas inlets 12 and 14. Referring to FIG. 6B, the electrical bus 27 protrudes through end plate 48 via an opening 47. When the array 20 moves relative to backing plate 62, the electrical bus 27 is likewise moved upward or downward through opening 47. However, the lower end of bellows joint 38 forms a tight seal in opening 47, and the upper end of bellows joint 38 is secured via a flange 39 to a bellows end cap 41 which is threaded onto the conductor bus 27. The end cap 41 is therefore at the same electrical potential as the conductor bus 27, but the bellows joint is electrically isolated from end cap 41 by isolator gasket 46a, isolator washers 46b and isolation sleeves 46c.

Because of the relatively high currents carried by conductors 26, 27 and 28, the resistance of the conductors generates a significant amount of heat, which must be dissipated. In the present invention, this heat dissipation is accomplished by cooling the conductors with a flow of water. The principles of cooling are best shown with reference to conductor 27 in FIG. 6B, but it should be recognized that similar principles are used with respect to conductors 26 and 28. A center bore 96 extends into conductor bus 27. A tube 99 is held in place by a compression fitting 98, with the top of tube 99 being connected to a source of water (not shown). Water is introduced into tube 99 in the direction shown by the arrows, and after flowing out the bottom of tube 99 the water exits the bore 96 via the side aperture 97 connected to the water return (not shown).

The array 20 of screen element packets 24 comprises, in the embodiment shown, an axially aligned group of nine screen element packets 24, with each packet having a left edge clamped into a left conductor block and each packet having a right edge clamped into a right conductor block. The respective left and right conductor blocks are aligned in end-to-end alignment with an electric isolator tab separating adjacent conductor blocks. Other arrays could be constructed, having more or fewer screen element packets, depending upon particular design requirements.

Figure 8A:
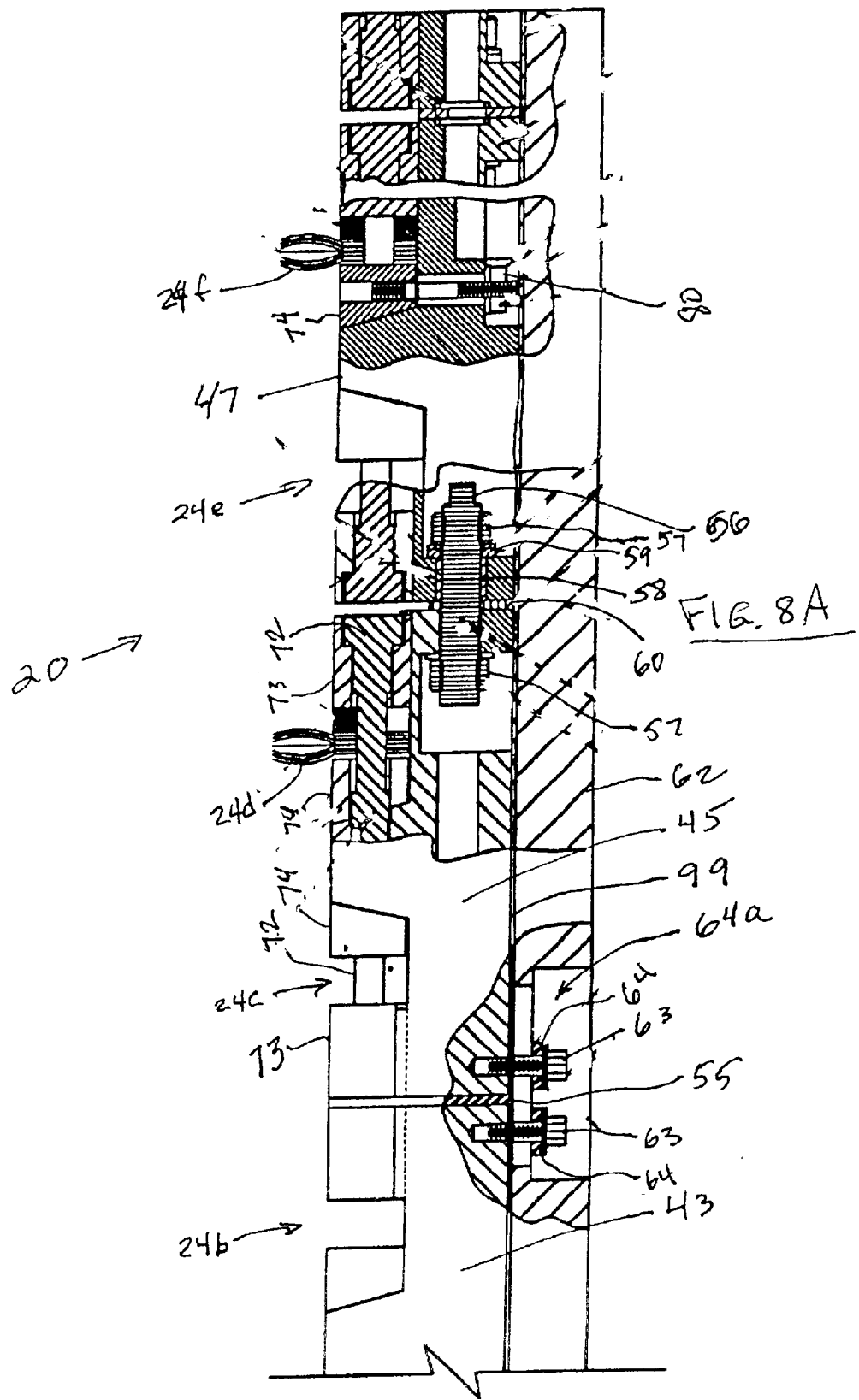
FIG. 8A shows the attachment detail for electrically connecting electric heater screen element packets.
Figure 7A:
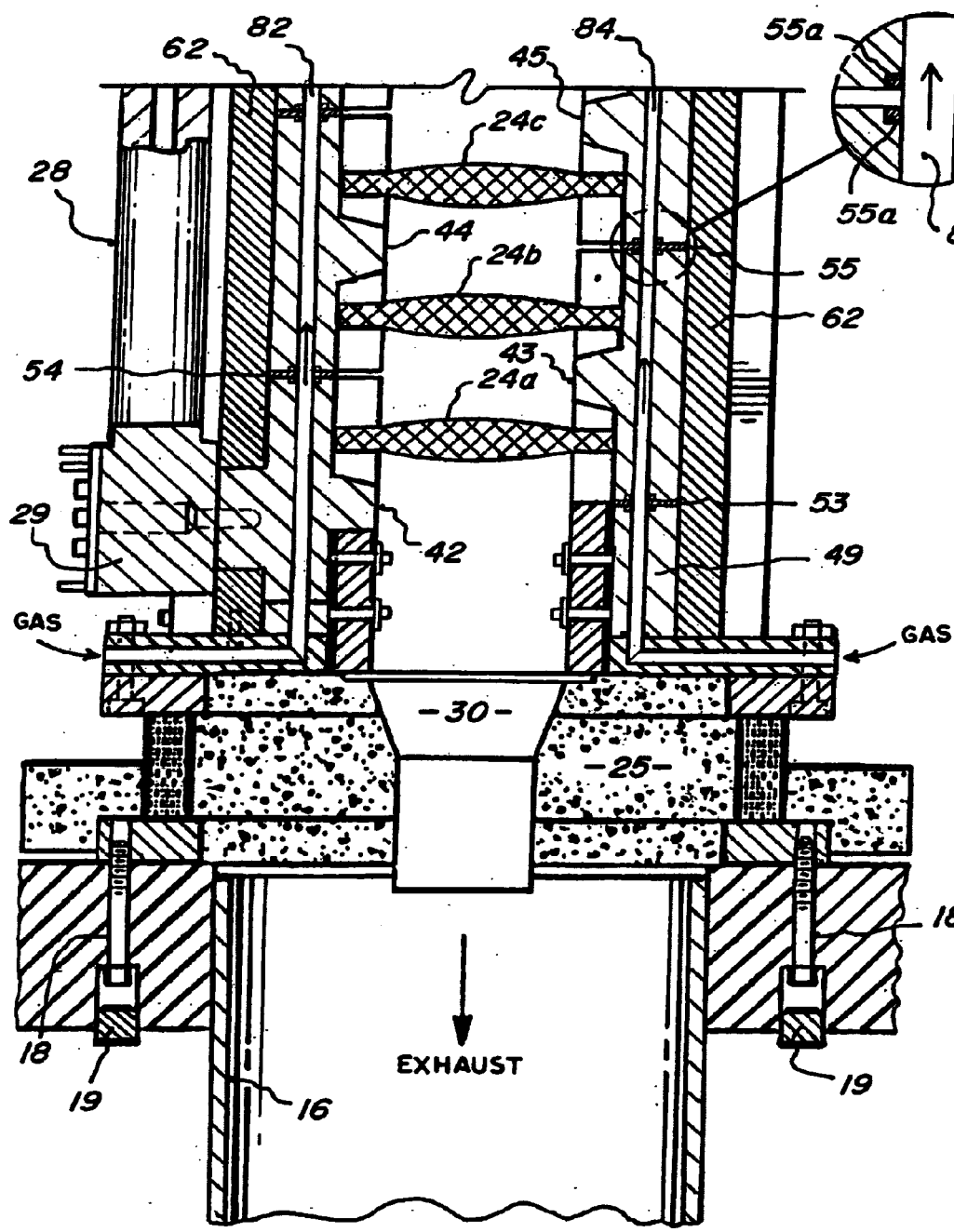
Figure 7B:
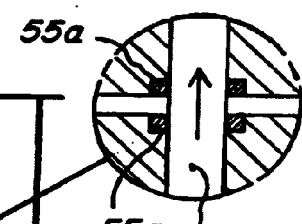
FIG. 7B shows an expanded view of an isolation spacer.
Figure 8C:
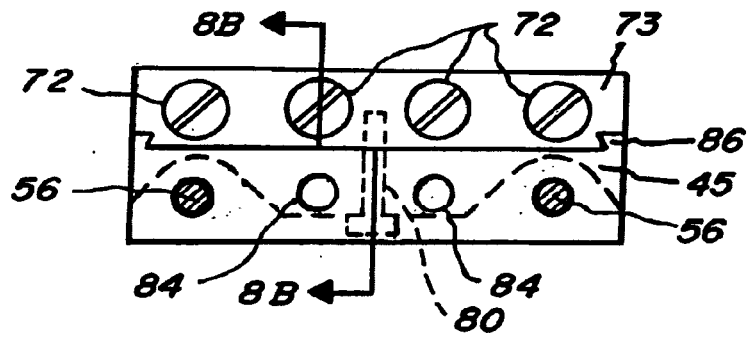
Figure 8B:
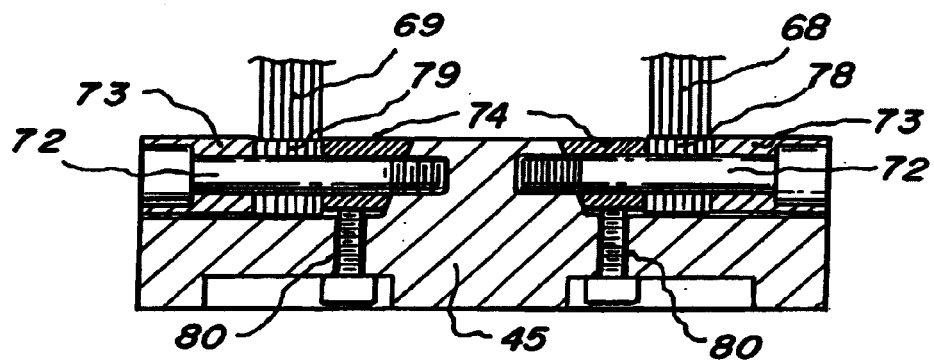
Figure 8D:
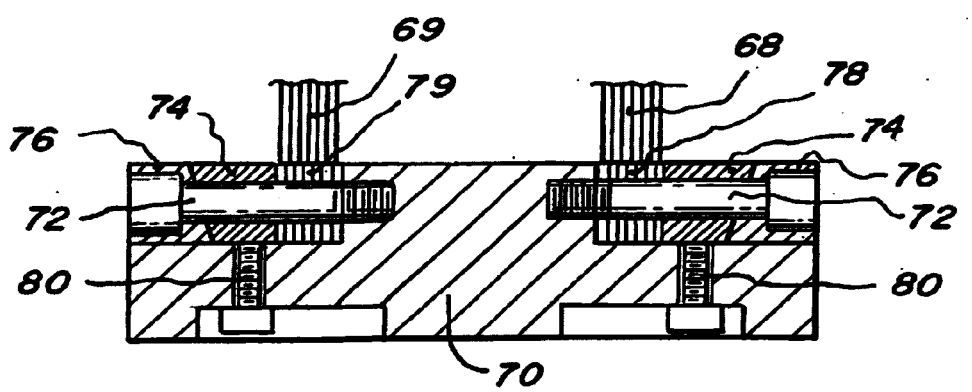
Figure 10:
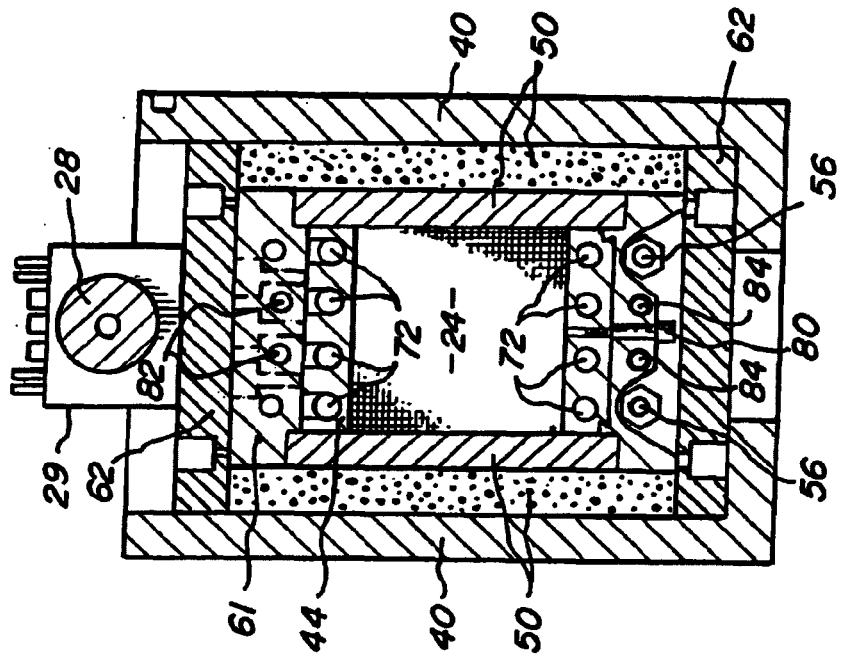
Figure 9:
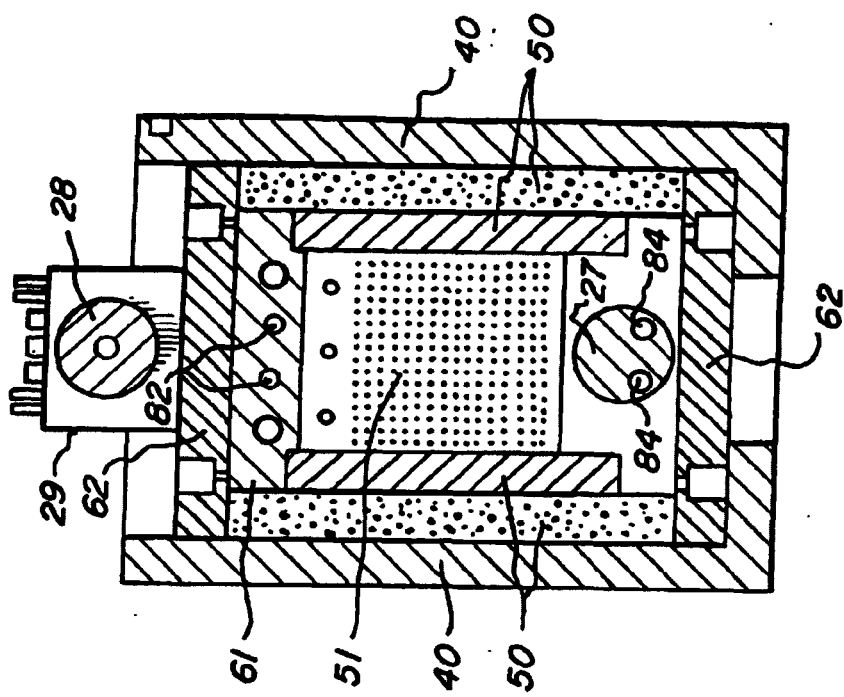

The electrical series connections of the screen element packets 24 is best seen with reference to FIG. 7A, FIG. 7B and FIG. 8A. Packet 24a has a left side edge termination clamped in a conductor block 42; conductor block 42 is electrically and mechanically connected to electrical conductor 28 via an electrical bus 29. The right side edge termination of packet 24a is clamped in a conductor block 43 which is electrically isolated from adjacent components by isolation spacers 53 and 55. Isolation spacer 55 is further shown in exploded view in FIG. 7B, to illustrate how the gas flow path integrity is maintained between the conductor blocks. Flexible metallic seals 55a, functioning as O-rings, are captured within glands that are machined around the respective flow passages. These seals are held in compression by the clamping force of the threaded fasteners 56 (see FIG. 8A) and they form a hermetic seal between the conductor block, e.g. 43, and the isolation spacer, e.g. 55.

Conductor block 43 also clamps the right side edge termination of packet 24b; the left side edge termination of packet 24b is clamped in conductor block 44, which is electrically isolated from conductor block 42 by an isolation spacer 54, and from the next adjacent conductor block by a similar isolation spacer. Conductor block 44 also clamps the left side edge termination of packet 24c; the right side edge termination of packet 24c is clamped in conductor block 45, which is electrically isolated from conductor block 43 by an isolation spacer 55, and from the next adjacent conductor block by a similar isolation spacer. The remaining packets are similarly connected, so as to electrically connect all packets in series arrangement. The last packet has a lower edge mechanically and electrically connected to conductor 26 via electrical bus 27, as can be seen in FIG. 5.

FIG. 8A shows an expanded view of a portion of array 20, in partial cross-section and with certain components removed for clarity of understanding the construction. For example, screen element packets 24b, 24c and 24e are removed to show the nature of the mechanical construction for clamping the packets to conductor blocks. Referring to conductor block 45 and its associated components, there are a plurality of fasteners 72 which are threaded into openings in the conductor block and which pass through corresponding slots in each screen element packet and the wedge block 74. The cap head of the fastener 72 holds the end piece 73 fixed relative to the conductor block.

Each of the screen element packets 24 are secured by drawing down on the wedge block 74, with the wedge block fasteners 80. As the wedge block 74 is drawn downwardly toward the conductor block, eg., 47, the end terminations of each screen element packet 24 are compressed between a wedge block 47 and an end piece 73. End piece 73 is free to slide along the bearing surface with a conductor block 47; hence, the force exerted on the end piece 73 is transferred to the fasteners 72, which are held in tension.

Adjacent conductor blocks are connected together by threaded fasteners 56 which are threadably engaged between two adjacent conductor blocks, passing through isolator spacers, such as spacer 60 between conductor block 45 and 47, and also pass through sleeve isolators such as sleeve 58. This is best seen with reference to conductor block 45 and its connection to conductor block 47 in FIG. 8A. Further, threaded fastener 56 is electrically isolated from conductor block 47 by isolation washer 59 and sleeve isolator 58. The threaded fasteners 56 have respective threaded nuts 57 for tightening together adjacent conductor blocks.

Each conductor block is connected to backing plate 62 by threaded fasteners 63 and electrical isolator washers 64. The conductor blocks are electrically isolated from the backing plate 62 with a dielectric sheet 99 that runs the length of backing plate 62. Fastener 63 and isolator washers 64 are situated in a common counterbore slot 64a, allowing the fasteners 63 to pass through the backing plate 62 and dielectric sheet 99 to their respective conductor blocks 43, 45. The slot 64a allows the array 20 to move relative to the backing plate 62 without exerting undue shear forces on the fasteners 63. The need for relative movement between the array 20 and the backing plate 62 is created because these components will be exposed to temperatures that differ by several hundred degrees, and this differential thermal expansion will cause relative movement.

Figure 8B:
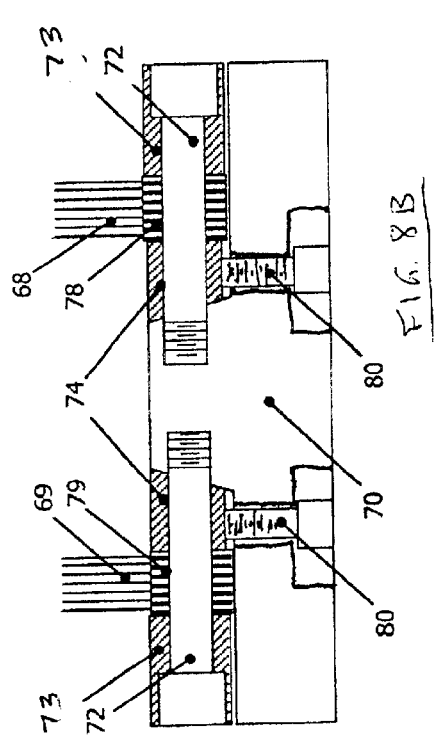
FIG. 8B shows a simplified illustrative cross-section taken along the lines 8B—8B of the end view of FIG. 8C, showing electrical heater screen element packet connections.

FIG. 8B shows a simplified illustrative drawing of the connections of the screen element packets and the conductor blocks. This construction provides for a sound electrical connection to the screen packets while eliminating the stresses due to differential thermal expansion. As the screen packet terminations 78, 79 expand due to heating, the deflection load is taken up by the threaded fasteners 72 that run through the center of the terminations and are fastened to the conductor block 70. The end piece 73 is free to slide lengthwise along the conductor block 70. Therefore, thermal expansion in the termination ends 78, 79 does not cause the conductor block to bend, but rather causes the end pieces 73 to slide along the conductor block surface. Because the fasteners 72 run through the center of the clamping components, they are subject to the same thermal environment and will tend to match the thermal expansion of the clamping components; this greatly reduces the thermal stress otherwise incurred during operation. It should be noted that the threaded fasteners 72 are "passive" in nature; ie, they are not intended to exert a clamping force via tightening. Rather, they serve only as stops for the end pieces. The clamping forces are generated by the wedge threaded fasteners 80 pulling down on the clamp wedges 74.

Figure 8D:
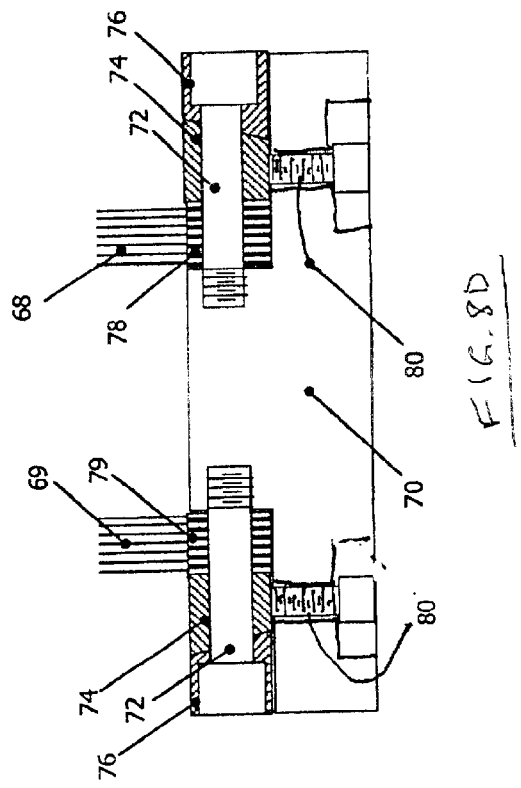
FIG. 8D shows an alternative cross-section view of a further clamping embodiment.
Figure 8C:
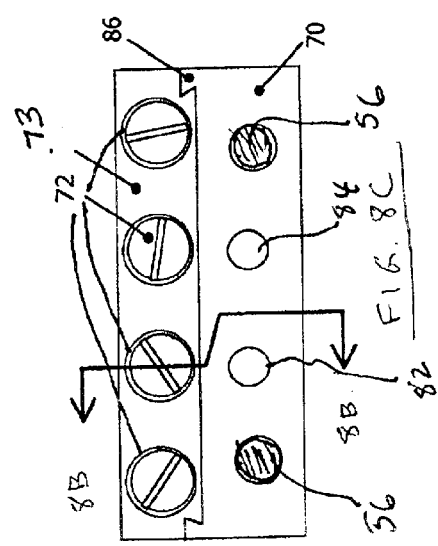
FIG. 8C shows an end view of one of the conductor blocks.

FIG. 8C shows an end view of a conductor block 70, showing an end piece 73 and fasteners 72. The notched engagement 86 between end piece 73 and conductor block 70 allows the end piece 73 to slide relative to conductor block 70, but prevents end piece 73 from any vertical movement away from conductor block 70. FIG. 8D shows an alternative construction, differing chiefly in the relative positioning of the wedge block 74 and the end piece 76. In this example, the wedge block 74 is drawn downwardly toward the conductor block 70 by sliding along the inclined plane of wedge block 74 and a tapered end piece 76.

Figures 9, 10:
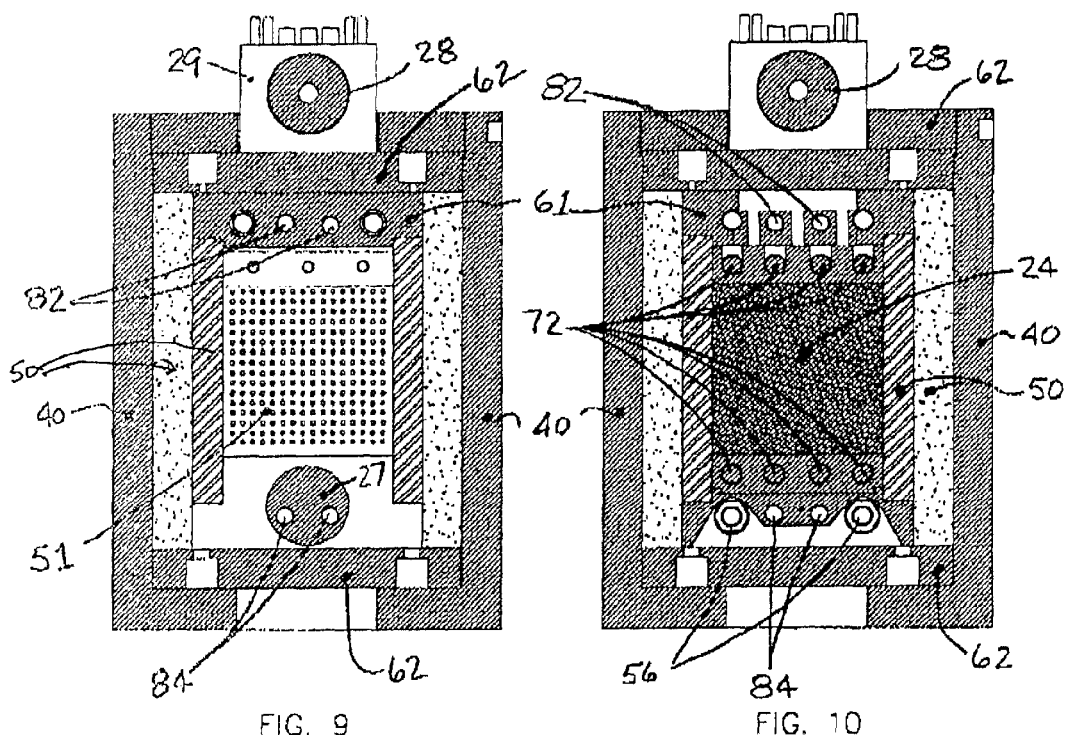
FIG. 9 shows a cross-section view taken along the lines 9—9 of FIG. 5.
FIG. 10 shows a cross-section view taken along the lines 10—10 of FIG. 5.
Figure 4:
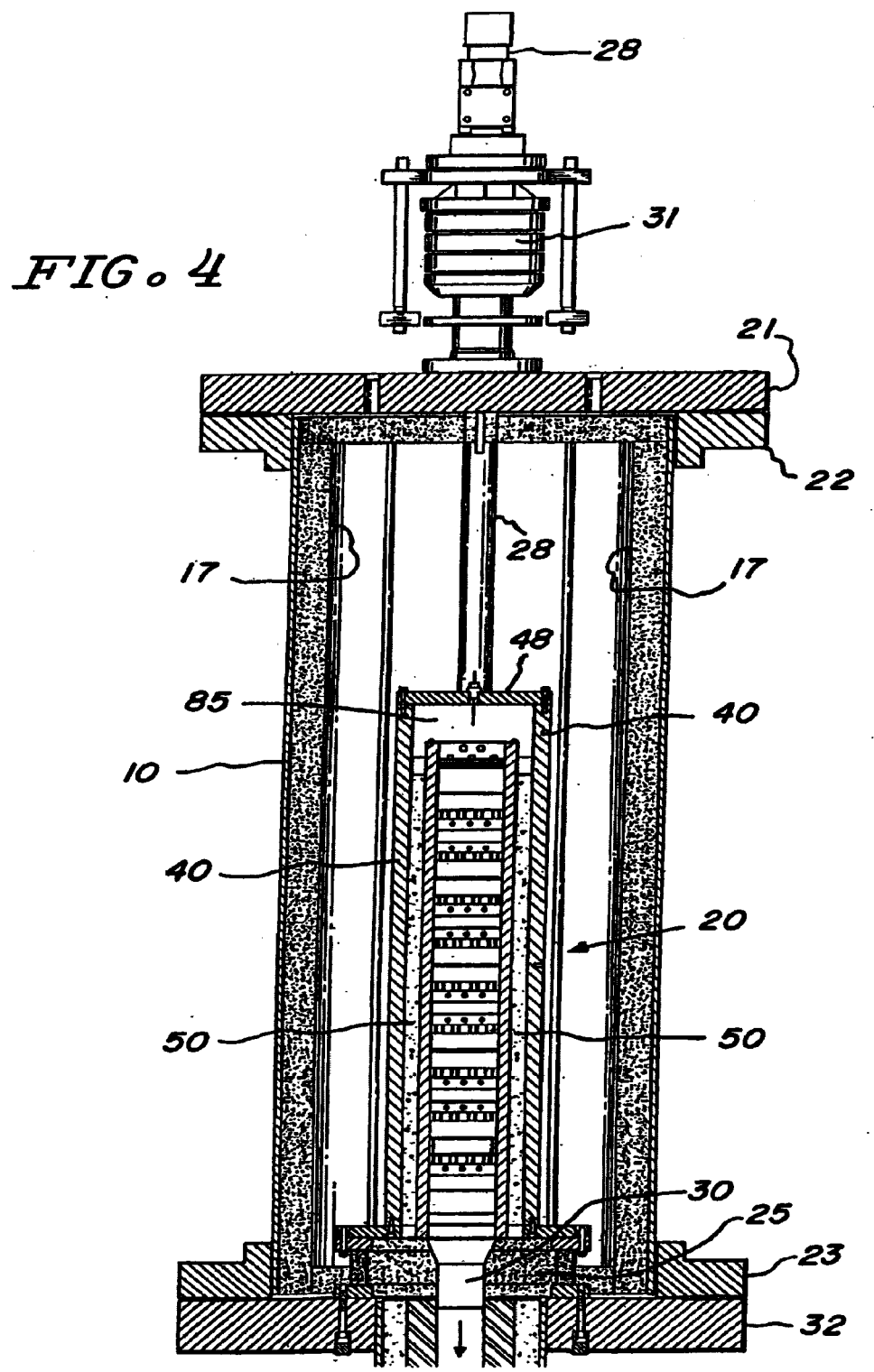
Figure 6A:
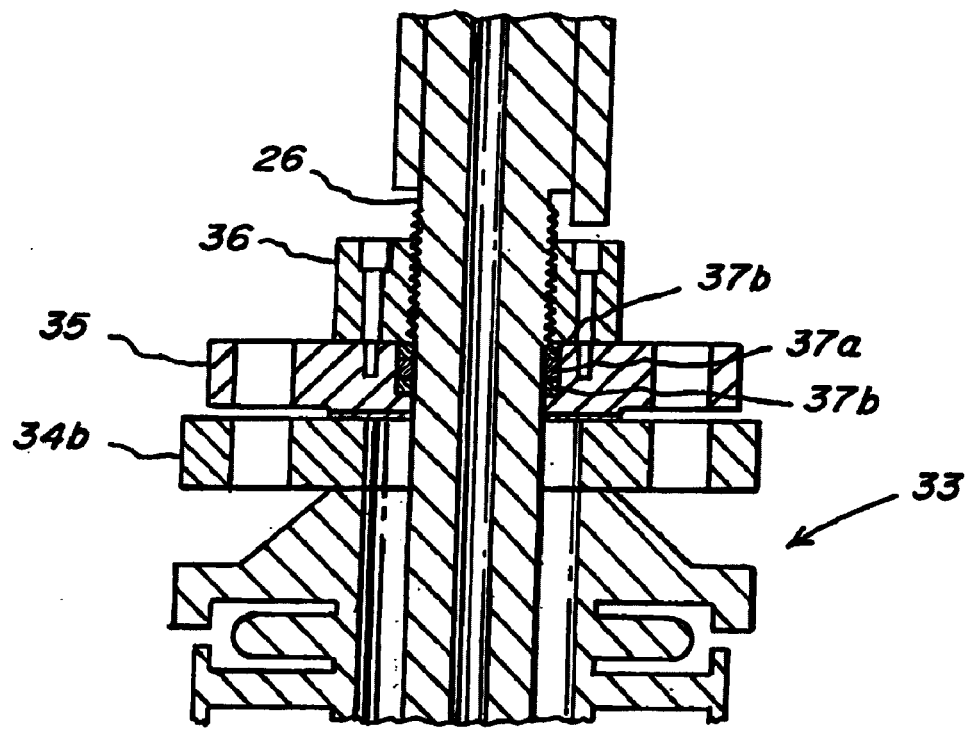
Figure 6B:
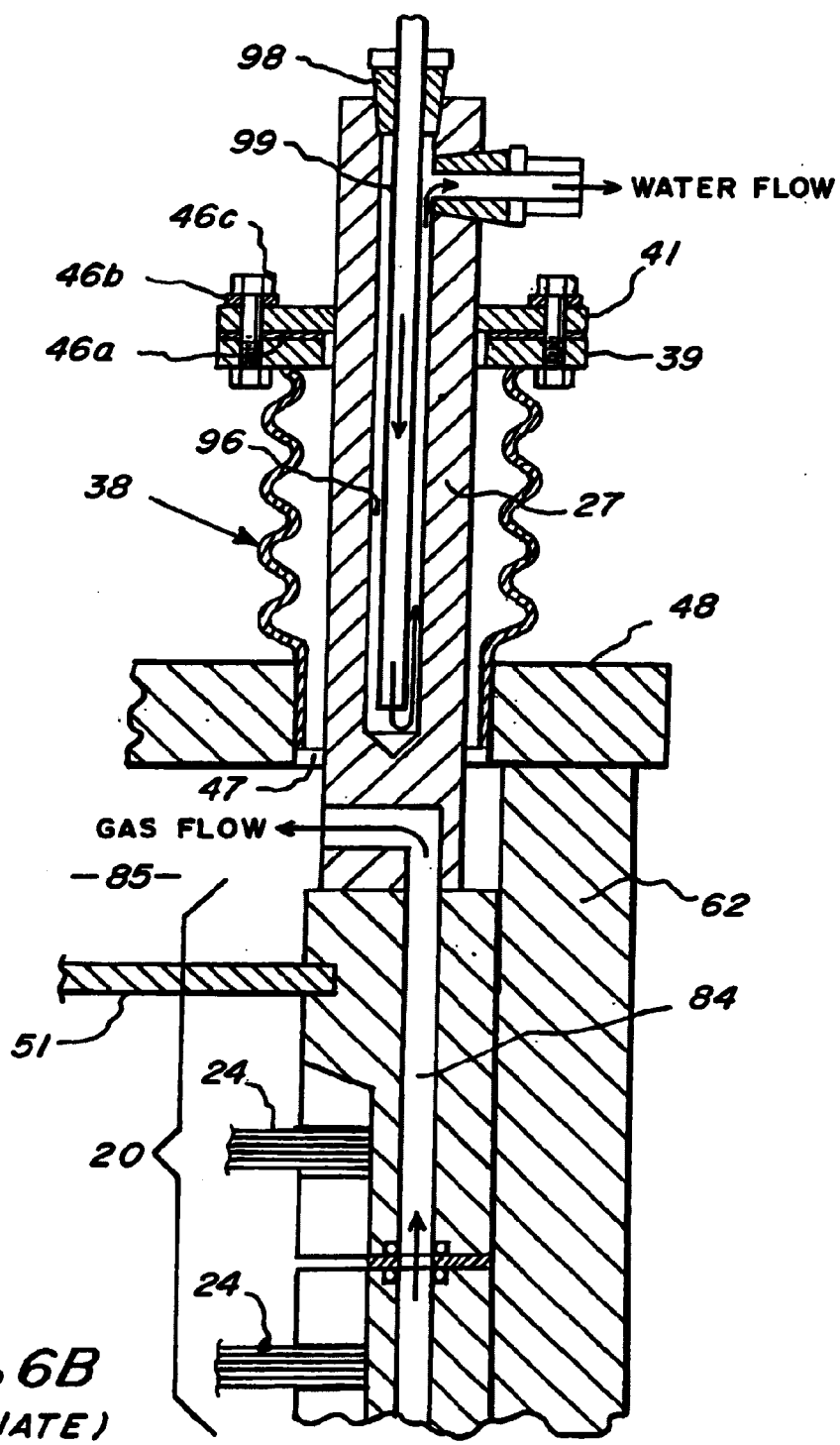

FIG. 9 shows a view taken along the lines 9—9 of FIG. 5. A flow spreader plate 51 is positioned across the gas flow path at the entrance to the heater array 20, and is supported between a pair of insulated support walls 40. This flow spreader plate serves to spread the flow of gas uniformly as it enters the gas flow channel, which flow of gas subsequently passes through all of the screen element packets 24. Composite insulation walls 50 line each of the support walls 40, so as to concentrate most of the heat generated by the screen element packets within the flow channel.

FIG. 10 shows a view taken along the lines 10—10 of FIG. 5. This view shows the positions of threaded fasteners 72, and the positions of threaded fasteners 56.

Another feature of the invention is the gas preheater function served by the gas flow paths through the internal passages; in the prior art, gas flow into the reactor was channeled directly from a gas source, and therefore the entire gas heating process was required to be performed during a single pass of the gas flow through the array 20. Referring to FIG. 7A, gas is drawn into flow passages 82, 84 and is directed through the outer sections of the array 20 via passages 82 along one side of the array, and via passages 84 along the other side of the array (see also FIGS. 9, 10). These passages open into chamber 85 proximate the entrance to the array (see FIG. 5). The gas flow is then drawn through the heated screen element packets 24 and out the outlet pipe 16. During the time the gas flow passes through the passages 82, 84, heat is transferred from the array 20 to the gas, such that the gas becomes preheated prior to entering the array inlet 85. It has been found that this structure causes the inlet gas to become preheated by at least several hundred degrees, and therefore requires less electrical heating energy to be supplied to the screen element packets. The gas also serves to dissipate the heat generated by the passage of electrical current through the conductor blocks.

The construction of the electric heater array 20 is best understood with reference to FIGS. 4, 5 and 7A. Because of the extremely wide range of temperature fluctuations which this array is subjected to, particular care must be taken with the construction and assembly. Each screen element packet 24a, 24b, 24c, etc. is constructed of a packet of metal wire mesh screens which are clamped together at their ends, and the entire individual packets are each securely clamped into a conductor block 42, 43, 44, etc. so as to provide good electrical connection and good mechanical coupling at any of a wide range of temperatures. Conductor blocks are clamped in adjacent alignment, with an isolator spacer placed between each adjacent pair of conductor blocks.

All of the conductor blocks rest on an isolated backing plate 62, and each conductor block is attached to backing plate 62 as described earlier. This connects all of the screen element packets and conductor blocks together to form array 20. The isolation of backing plate 62 is best seen with reference to FIG. 8A, which shows a thin dielectric sheet 99 between the backing plate 62 and the conductor blocks.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A chemical process reactor for processing an industrial gas flow through the application of heat, comprising:
   a. a housing having at least one gas flow inlet for receiving said industrial gas flow, and at least one outlet;
   b. a gas flow channel within said housing, and an array of current-carrying wire screen element packets connected between respective conductor blocks, said conductor blocks forming outside walls of said channel and said packets positioned at spaced apart intervals across said channel from a first position proximate said outlet and a second position internal to said housing;
   c. a plurality of passages through said conductor blocks, having respective inlet openings in flow communication with said at least one gas flow inlet, and having respective outlet openings proximate said second position of said channel;
   d. said array further comprising a first electrical bus connected to a respective first conductor block proximate said outlet, and a second electrical bus connected to a respective last conductor block proximate said second position, each of said conductor blocks being electrically isolated from other conductor blocks, and each of said screen element packets having a first termination connected to a conductor block on one side of said channel and having a second termination connected to a conductor block on the other side of said channel, whereby a series electrical path is created from said first electrical bus through respective conductor blocks and screen element packets to said second electrical bus;
   e. a first conductor connected to said first electrical bus and projecting externally of said housing, and a second conductor connected to said second electrical bus and projecting externally of said housing; and
   f. a pair of expansion joints respectively attached to said housing, each of said expansion joints having a movable end connected to one of said first or second conductors.

2. The apparatus of claim 1, wherein each of said screen element packets further comprise a plurality of conductive metal screen sections arranged in layers, said sections being collectively attached together at respective first and second parallel edges to form first and second edge terminations.

3. The apparatus of claim 2, wherein said conductor blocks in said array each further comprise a flat surface adjacent respective ends, with a center section having a raised portion, said raised portion further comprising an inclined plane surface; an end piece slidable along each of said flat surfaces; a wedge block having an inclined surface facing said inclined plane and being slidable thereon, and means for drawing said wedge block along said inclined plane and toward said conductor block respective flat surfaces.

4. The apparatus of claim 3, further comprising engagement slots between said conductor block and each of said end pieces, whereby movement of said end pieces away from said conductor block is restrained, while relative sliding motion is permitted.

5. The apparatus of claim 4, further comprising a screen element packet termination edge clamped between said wedge block and said end piece.

6. The apparatus of claim 5, further comprising aligned openings through said end piece, said wedge block, said termination edges of said screen element packet, and said center section of said conductor block, and rods passing through said aligned openings, said rods being threadably attachable to said center section.

7. The apparatus of claim 1, further comprising first and second electrically isolate backing plates, each plate aligned along said channel outside said conductor blocks, whereby said conductor blocks are slidable over respective ones of said first and second electrically isolated backing plates.

8. The apparatus of claim 1, wherein said pair of expansion joints each further comprise a base sealably connected to said housing and extending about one of said conductors, an expandable bellows body extending from said base and connecting to a flange which is fixedly attached to said conductor.

9. A chemical process reactor for processing an industrial gas by flowing the gas through the reactor and heating the gas during its residence time within the reactor, comprising:
   a. a reactor housing having a gas inlet and a gas outlet proximate one end, and having a conductor pair extending from the other end;
   b. an elongate frame in said housing, having a first end proximate said gas outlet and having a second end extending substantially into said housing, whereby a gas flow channel is created through said frame to said gas outlet;
   c. an array of current-carrying wire screen element packets aligned at spaced apart positions, each element being fixedly attached between a pair of conductor blocks, and said conductor blocks being attached in adjacent alignment along said frame;
   d. a plurality of aligned passages through said conductor blocks and an entry passage through said frame proximate said gas inlet, said entry passage being in flow communication between said gas inlet and said plurality of aligned passages; said plurality of aligned passages respectively opening proximate said interior gas channel opening;
   e. said array further comprising a first electrical bus connected to a respective first conductor block proximate said frame first end, and a second electrical bus connected to a respective last conductor block proximate said frame second end, each of said conductor blocks being electrically isolated from other conductor blocks, and each of said screen element packets having a first termination connected to a conductor block on one side of said channel and having a second termination connected to a conductor block on the other side of said channel, whereby a series electrical path is created from said first electrical bus through said respective conductor blocks and screen element packets to said second electrical bus;
   f. a first conductor connected to said first electrical bus and projecting externally of said reactor housing and a second conductor connected to said second electrical bus and projecting externally of said reactor housing; and
   g. A pair of expansion joints respectively connected to said housing and each of said joints connected to a first or second conductor.

10. The apparatus of claim 9, wherein each of said screen element packets further comprise a plurality of conductive metal screen sections arranged in layers, said sections being collectively attached together at respective first and second parallel edges to form first and second edge terminations.

11. The apparatus of claim 10, wherein each of said conductor blocks in said array further comprise at least one end piece having a raised edge; a center section having a raised portion with an inclined plane surface facing said end piece; a wedge block having an inclined surface facing said inclined plane and being slidable thereon, and means for drawing said wedge block along said inclined plane and inwardly toward said conductor block.

12. The apparatus of claim 11, further comprising a screen element packet termination edge clamped between said wedge block and said end piece.

13. The apparatus of claim 12, further comprising first and second electrically isolated backing plates, each plate aligned along said channel outside said conductor blocks whereby said conductor blocks are slidable over respective ones of said first and second electrically isolated backing plates.

14. A chemical process reactor for heating gas in a continuous flow passing through the reactor, comprising:
   a. a housing having an inlet for receiving gas flow, and interior chamber, and an outlet for passing gas flow;
   b. an elongate structure in said interior chamber, said structure having elongate, thermally-insulated walls and respective open ends, thereby creating a gas channel flow path inside said walls, one of said open ends being positioned proximate said outlet;
   c. an elongate array of spaced-apart wire screen element packets in said gas channel, each of said packets having a first termination end clamped to a conductor on one side of said channel and a second termination end clamped to a conductor on the other side of said channel, all of said packets and conductors electrically connected in series, thereby providing a current flow path between a forwardmost screen packet and a rearwardmost screen packet and passing through all intermediate screen packets;
   d. a first conductor attached to one end of said array, and a second conductor attached to the other end of said array, both of said conductors having respective ends projecting externally of said housing; each of said conductors further comprising thermal expansion joints permitting relative movement between said conductor and said housing; and
   e. gas passages through said conductors on each side of said channel, said passages being in flow communication with said housing inlet at one end, and said gas channel on the other end.

15. The apparatus of claim 14, wherein said array further comprises a first electrical bus connected to a respective first conductor block proximate said outlet, and a second electrical bus connected to a respective last conductor block proximate the interior end of said channel; each of said conductor blocks being electrically isolated from other conductor blocks; each of said screen element packets having a first termination end connected to a conductor block on one side of said channel and having a second termination end connected to a conductor block on the other side of said channel, whereby said series electrical path is created from said first electrical bus through respective conductor blocks and screen element packets to said second electrical bus.

16. The apparatus of claim 15, wherein each of said screen element packets further comprise a plurality of conductive metal screen sections arranged in layers, said sections being collectively attached together at respective first and second parallel edges to form first and second edge terminations.

17. The apparatus of claim 16, wherein said conductor blocks in said array each further comprise a flat surface adjacent respective ends, with a center section having a raised portion, said raised portion further comprising an inclined plane surface; an end piece slidable along each of said flat surfaces; a wedge block having an inclined surface facing said inclined plane and being slidable thereon, and means for drawing said wedge block along said inclined plane and toward said conductor block respective flat surfaces.

18. The apparatus of claim 17, further comprising a screen element packet termination edge clamped between said wedge block and said end piece.

19. The apparatus of claim 18, further comprising aligned openings through said end piece, said wedge block, said termination edges of said screen element packet, and said center section of said conductor block, and threaded fasteners passing through said aligned openings, said threaded fasteners being threadably attachable to said center section.

* * * * *

UNITED STATES PATENT AND TRADEMARK OFFICE
CERTIFICATE OF CORRECTION

PATENT NO.   : 6,841,134 B2
DATED        : January 11, 2005
INVENTOR(S)  : Hanus et al.

It is certified that error appears in the above-identified patent and that said Letters Patent is hereby corrected as shown below:

Delete Title page illustrating figure, and substitute therefor, new Title page illustrating figure (attached).

Delete drawing sheets 1-9, and substitute therefor, drawing sheets 1-9, with the attached sheets.

Signed and Sealed this

Twentieth Day of December, 2005

JON W. DUDAS
*Director of the United States Patent and Trademark Office*

(12) United States Patent
Hanus et al.

(10) Patent No.: US 6,841,134 B2
(45) Date of Patent: Jan. 11, 2005

(54) ELECTRICALLY-HEATED CHEMICAL PROCESS REACTOR

(75) Inventors: Gary J. Hanus, Edina, MN (US); Stuart J. Olstad, Maple Grove, MN (US)

(73) Assignee: Phoenix Solutions Co., Crystal, MN (US)

(*) Notice: Subject to any disclaimer, the term of this patent is extended or adjusted under 35 U.S.C. 154(b) by 813 days.

(21) Appl. No.: 09/760,081

(22) Filed: Jan. 12, 2001

(65) Prior Publication Data

US 2002/0094312 A1 Jul. 18, 2002

(51) Int. Cl.$^7$ ................................. F01N 3/02
(52) U.S. Cl. ................. 422/174; 422/199; 422/187
(58) Field of Search ........................ 422/198, 199, 422/187, 173, 174

(56) References Cited

U.S. PATENT DOCUMENTS

| | | | | |
|---|---|---|---|---|
| 3,811,845 A | * | 5/1974 | Nakamura | 422/173 |
| 4,692,306 A | * | 9/1987 | Minet et al. | 422/49 |
| 5,409,669 A | * | 4/1995 | Smith et al. | 422/174 |
| 5,453,116 A | * | 9/1995 | Fischer et al. | 95/278 |
| 5,711,816 A | * | 1/1998 | Kirlin et al. | 118/726 |
| 6,214,296 B1 | * | 4/2001 | Lou et al. | 422/148 |

OTHER PUBLICATIONS

Olstead et al, "Organic Compound Destruction and Removal Efficiency (DRE) for Plasma Incinerator Off–gases Using an Electrically Heated Secondary Combustion Chamber" 1998 Proceedings on IT3 Conference, May 11, 1998, pp 419–421, Salt Lake City, UT.

Reed et al, "Electric Heater Development and Performance Data for Mach 14 Wind Tunnel", Journal of Spacecraft and Rockets, vol. 12, No. 5, pp 308–313, May, 1974.

"Phoenix Solutions Co.—Products and Services", sales brochure, Nov., 1998.

Background/Qualifications of Phoenix Solutions Co . . . sales brochure, Jul. 15, 1996.

* cited by examiner

Primary Examiner—Kiley S. Stoner
Assistant Examiner—Len Tran
(74) Attorney, Agent, or Firm—Nikolai & Mersereau, P.A.; Thomas J. Nikolai

(57) ABSTRACT

An electrically-heated chemical process reactor having an inlet for receiving industrial gases, an internal channel for passing the flow of gases, and an outlet for expelling the gases. An array of current-carrying screen element packets are arranged along the channel for receiving a heating current, and the internal gas channel includes passages through the array for preheating the gas prior to entering the channel.

19 Claims, 9 Drawing Sheets

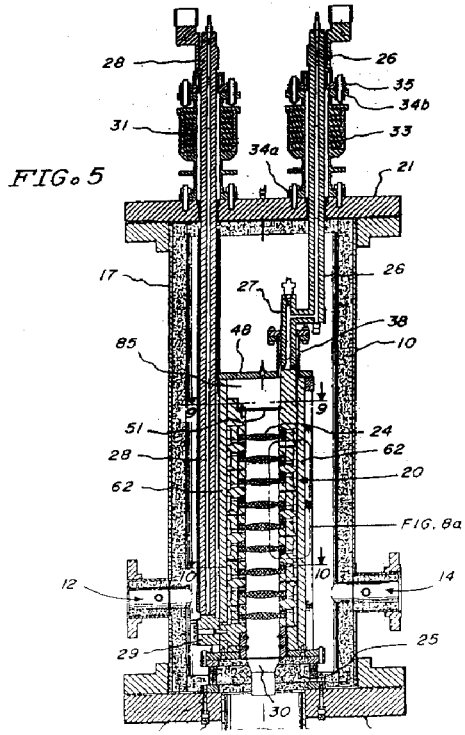

FIG. 5

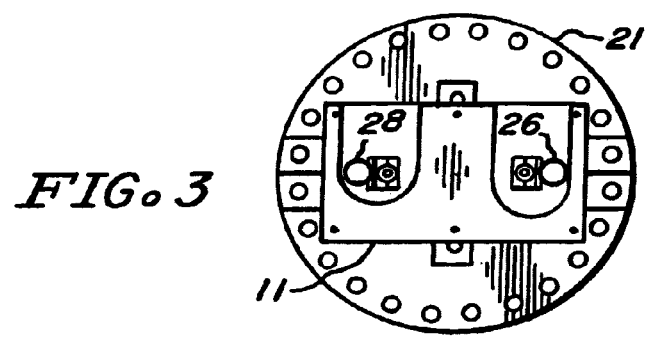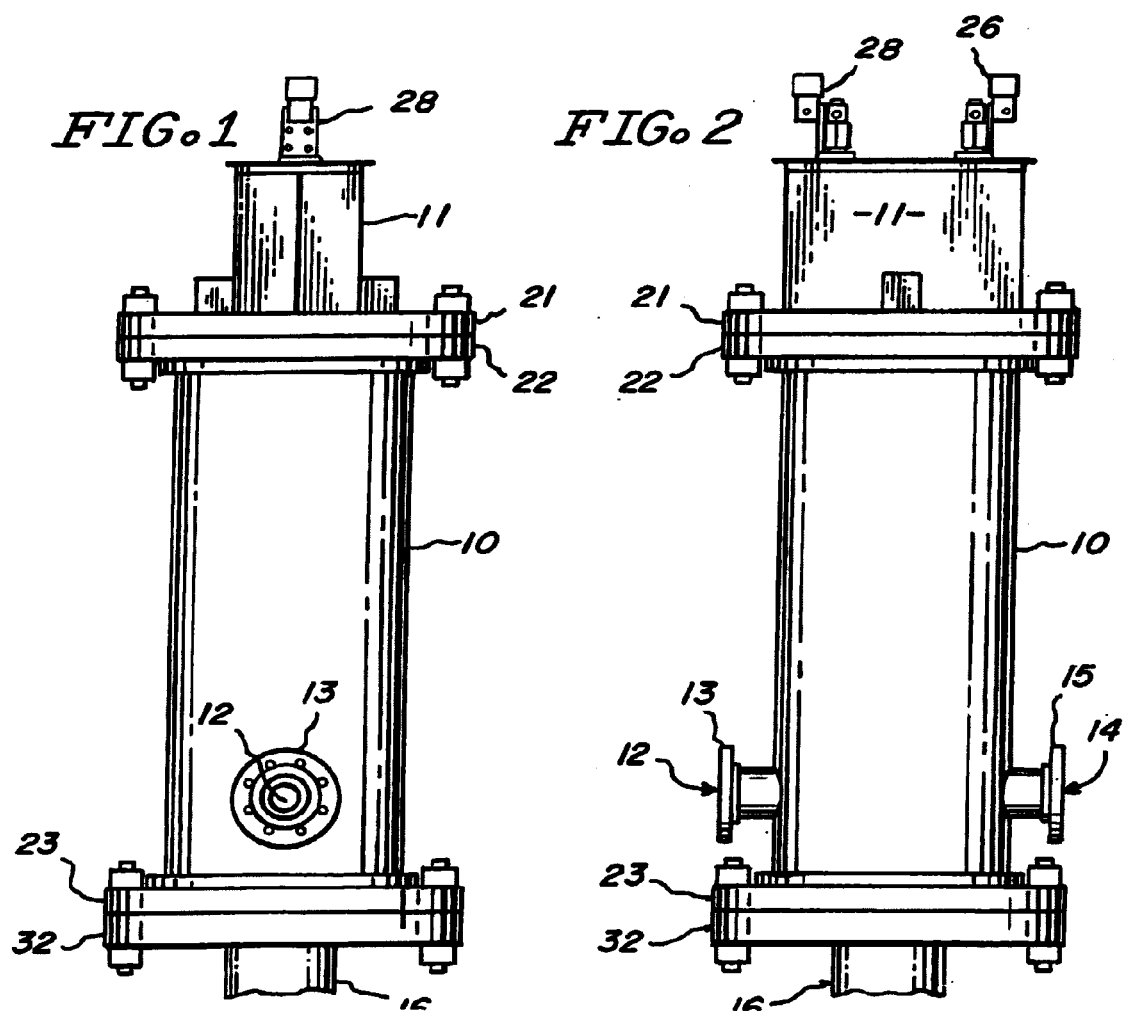

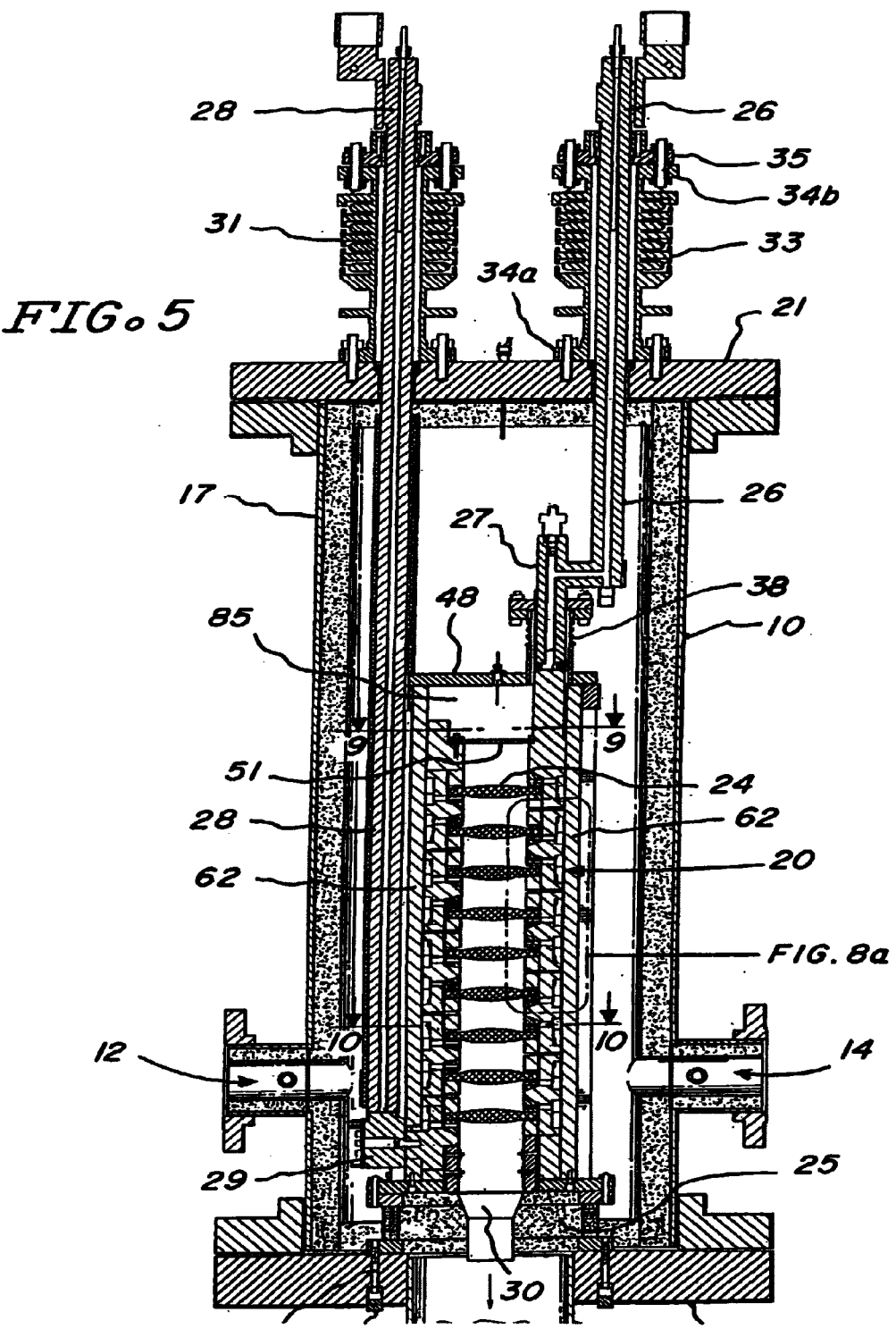

(ALTERNATE)

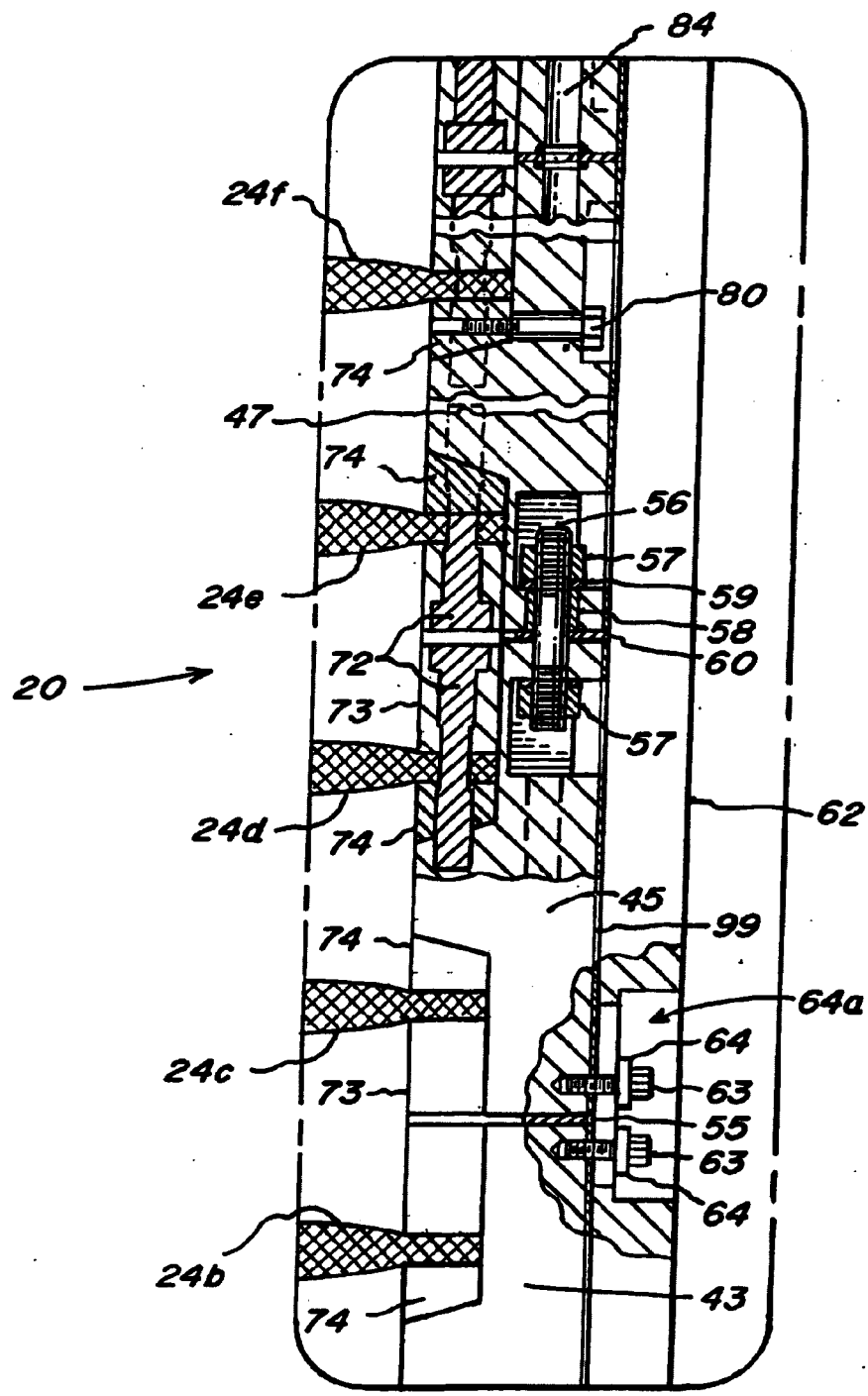

(ALTERNATE)